United States Patent [19]

Miller et al.

[11] 4,419,234

[45] Dec. 6, 1983

[54] MULTIPLE CARTRIDGE FILTER ASSEMBLY WITH REMOVABLE FILTER CARTRIDGE ARRAY

[75] Inventors: John D. Miller, Homer; Clayton L. Reed, Tolly, both of N.Y.

[73] Assignee: Pall Corporation, Glen Cove, N.Y.

[21] Appl. No.: 406,095

[22] Filed: Aug. 6, 1982

Related U.S. Application Data

[63] Continuation-in-part of Ser. No. 305,069, Sep. 24, 1981, abandoned.

[51] Int. Cl.$^3$ ............................................ B01D 27/08
[52] U.S. Cl. ................................ 210/232; 210/323.2; 210/445
[58] Field of Search ........................ 210/232, 236–238, 210/323.2, 340, 341, 445, 450, 451–453

[56] References Cited

U.S. PATENT DOCUMENTS

| | | | |
|---|---|---|---|
| 519,664 | 5/1894 | Chamberland | 210/323 |
| 2,859,876 | 11/1958 | Brundage | 210/323.2 X |
| 2,921,686 | 1/1960 | Forman et al. | 210/323 |
| 3,037,635 | 6/1962 | Boorujy | 210/330 |
| 3,117,925 | 1/1964 | Kasten | 210/96 |
| 3,151,071 | 9/1964 | Kasten | 210/232 |
| 3,216,572 | 11/1965 | Kasten | 210/97 |
| 3,341,023 | 9/1967 | Seter | 210/237 |
| 3,367,503 | 2/1968 | Topol | 210/96 |
| 3,405,807 | 10/1968 | Burkhardt | 210/232 |
| 3,406,831 | 10/1968 | Bush et al. | 210/438 |
| 3,438,502 | 4/1969 | Schmidt, Jr. et al. | 210/323.2 X |
| 3,680,700 | 8/1972 | Ryan | 210/777 |
| 4,237,011 | 12/1980 | Acosta | 210/237 |

Primary Examiner—Thomas G. Wyse
Attorney, Agent, or Firm—Leydig, Voit, Osann, Mayer & Holt, Ltd.

[57] ABSTRACT

A multiple cartridge filter assembly is provided with a removable filter array to facilitate the rapid replacement of an entire array having spent cartridges with another identical array having fresh cartridges, after which the spent cartridges of the removed array may be replaced. The removable filter array includes a separation plate from which the filter cartridges hang suspended in sealing engagement therewith and a dual position support platform connected to the separation plate and located beneath the lower blind ends of the cartridges. The support platform maintains the cartridges sealingly engaged with the separation plate when the removable array is in its working condition but automatically drops down relative to the separation plate when the array is removed to accommodate the replacement of the cartridges. In the preferred practice of the invention the movement of the support platform relative to the separation plate is limited to that which permits removal of the filter cartridges at an angle but not vertically.

10 Claims, 11 Drawing Figures

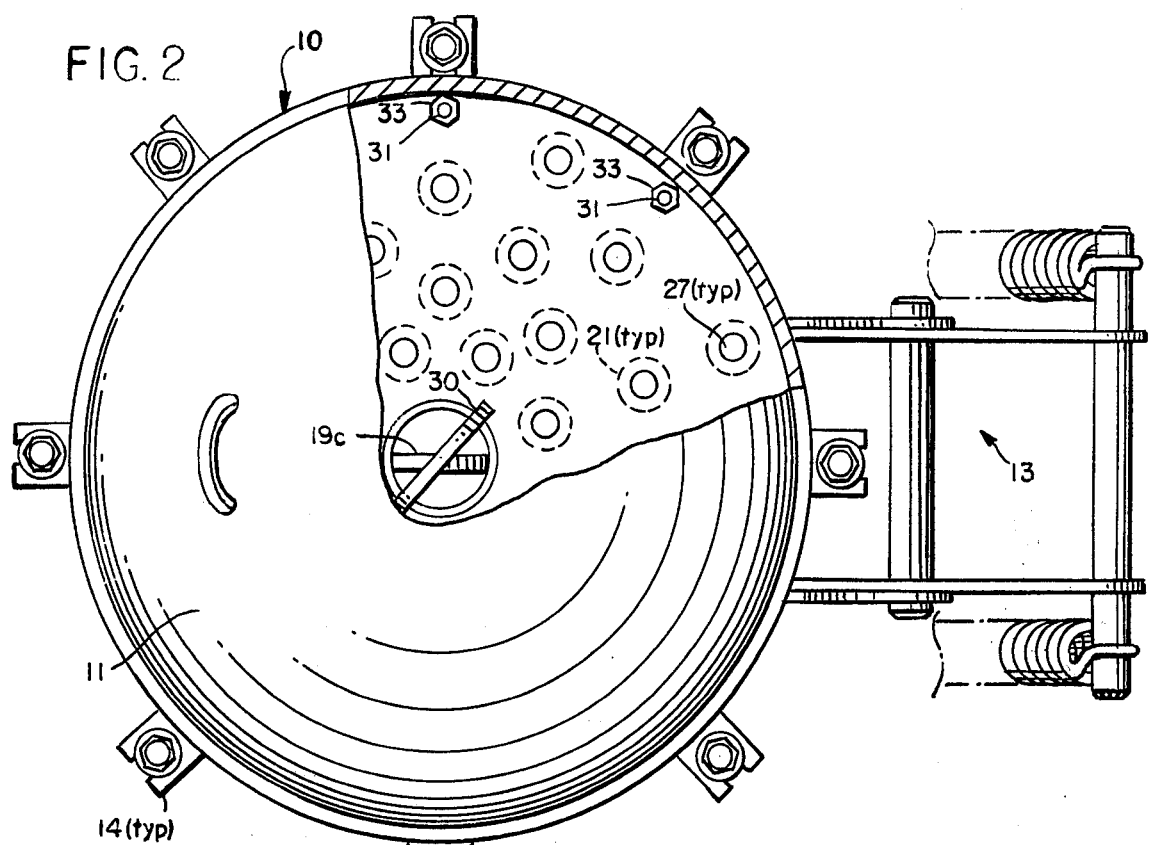
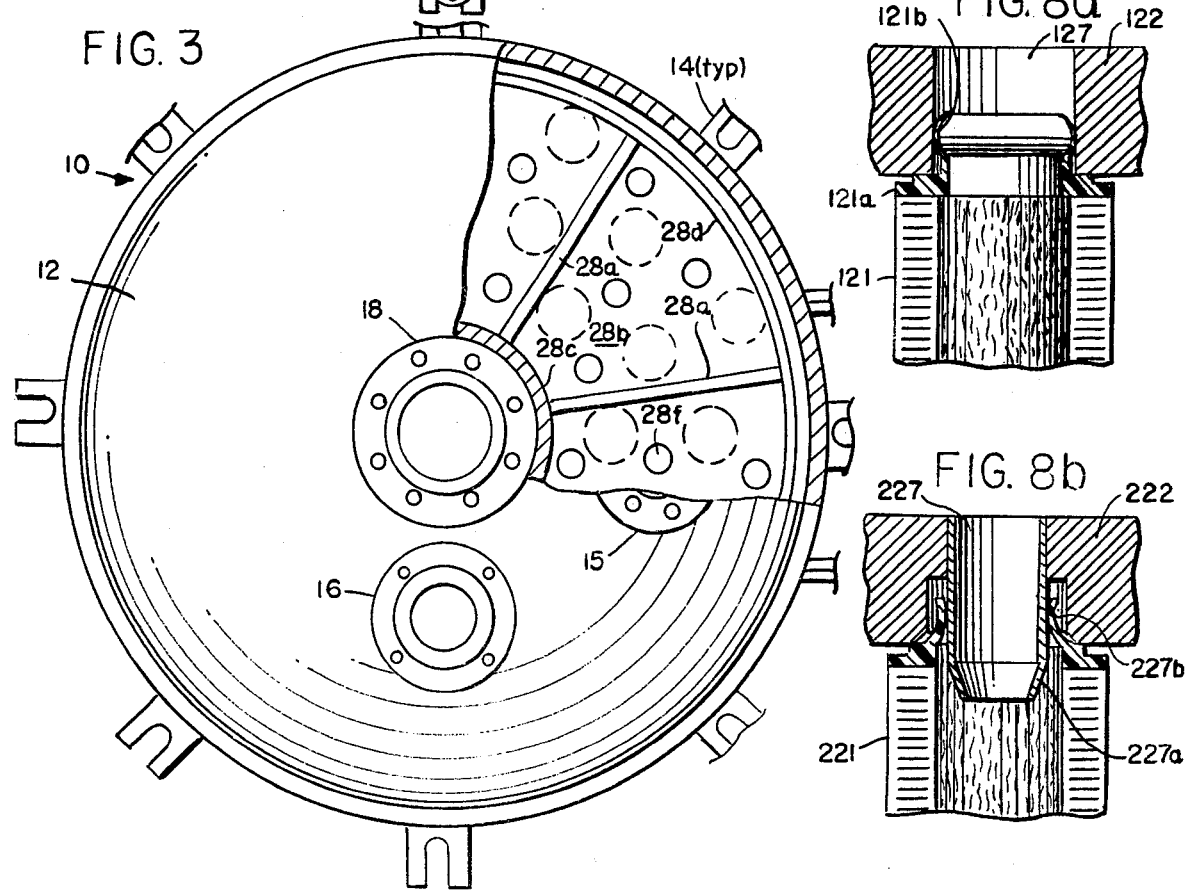

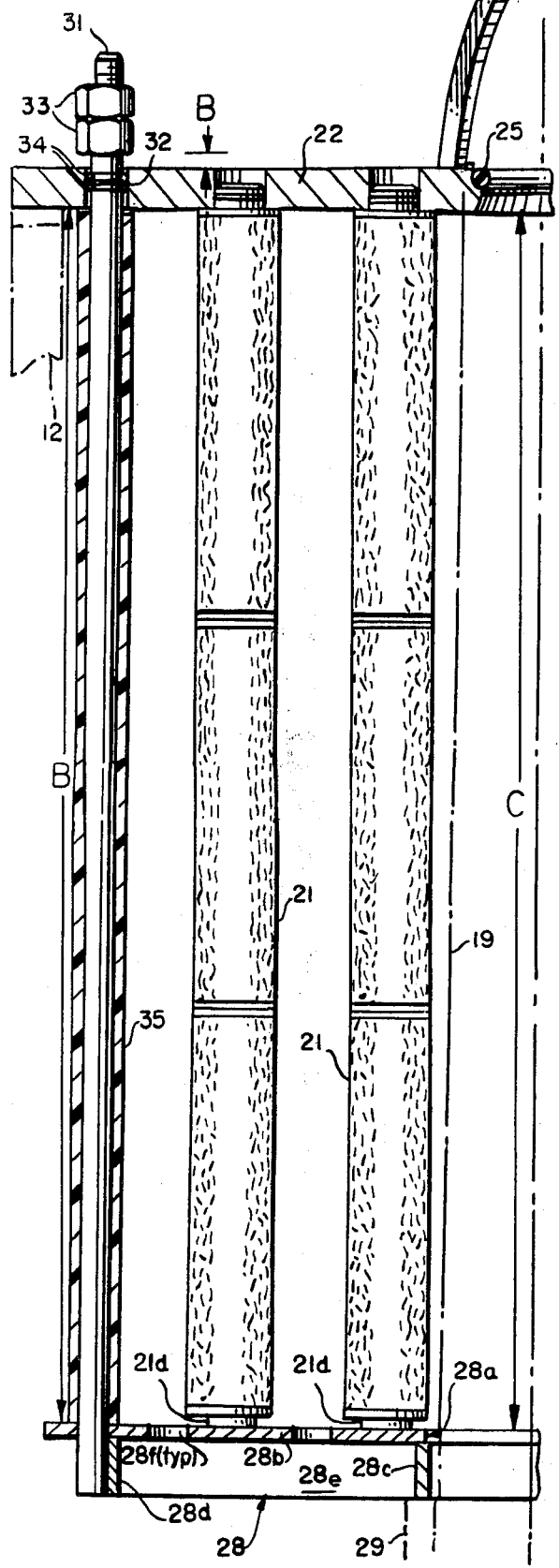
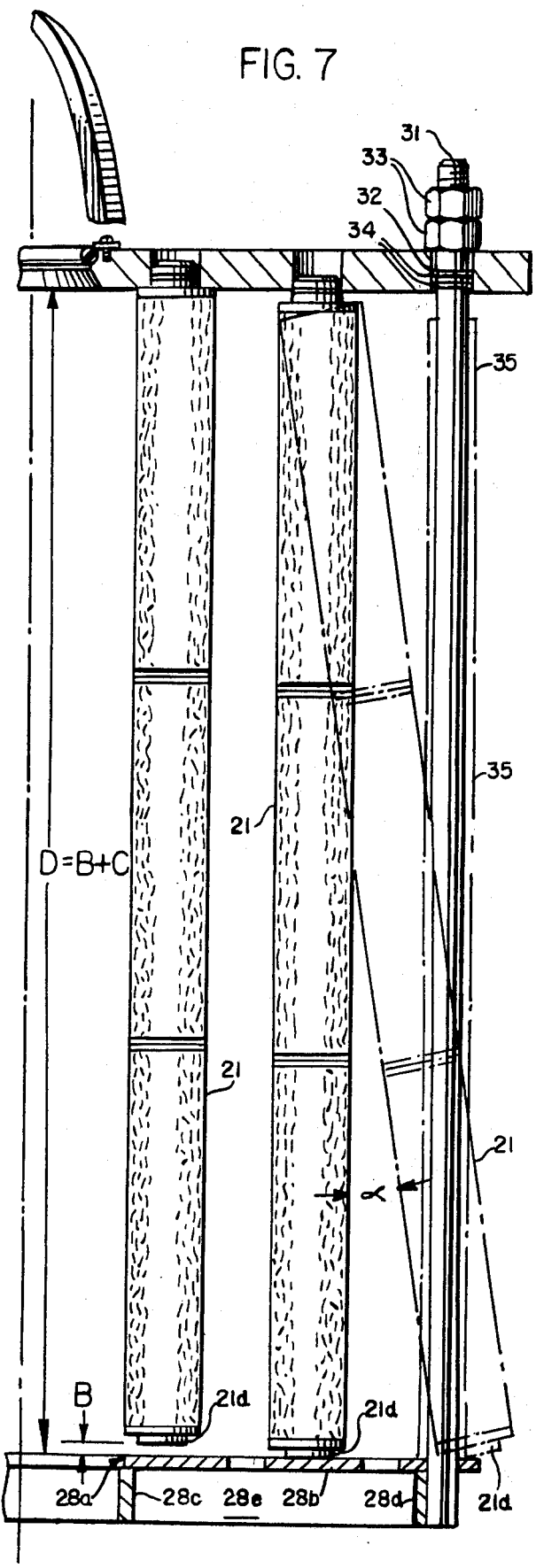

MULTIPLE CARTRIDGE FILTER ASSEMBLY WITH REMOVABLE FILTER CARTRIDGE ARRAY

DESCRIPTION OF THE INVENTION

This application is a continuation-in-part of Ser. No. 305,069 filed Sept. 24, 1981, abandoned.

A filtration application which calls for the fine filtration of large volumes of highly contaminated fluids with limited interruptions over an extended period of time necessitates the balancing of several competing factors, including as principal ones the cost of the capital equipment, the cost of the renewing of the filter medium, the manpower required to keep the system "on stream", and the length of flow interruption, if any, which can be tolerated to renew the filter medium. In general, increasing the surface area of the filter medium for an assumed flow and contaminant loading will decrease the flow density and increase the useful life of the filter medium.

One convenient form of filter which is widely used throughout the filtration industry is the elongated tubular filter cartridge. Common configurations for such filter cartridges are 2 to 3 inches in diameter in a variety of lengths. In applications where a single such cartridge is inadequate, it is well known to provide a plurality of cartridges connected in parallel to a single plate separating the unfiltered fluid from the filtrate. Increasing the number of cartridges usually requires increasing the cross section of the chamber. Subject to internal flow considerations, the lengths of cartridges can also be increased as by "stacking up" two or more unit lengths, but this obviously requires lengthening the chamber. There is usually a practical—often in terms of economics but sometimes in terms of allowable space—limit to the size of the chamber which can be tolerated.

Generally, at some point, regardless of the size of the filter chamber employed, the filter medium will have to be renewed. In some instances the filter medium can be cleaned in situ, as through backflushing. In other instances, however, the filter medium must be removed from the filter chamber, either to be cleaned or replaced. Even with the convenience of filter cartridges, such an operation can be time consuming, especially in the case of large filter chambers containing a large number of cartridges. In applications where interruptions must be minimized, the effects of a time-consuming filter medium changeover can be lessened by having multiple filter chambers in parallel, only one or some of which are "on stream" at a given instant. Such an arrangement is obviously subject to the practical limitations of capital cost and space availability discussed above.

An application in which the various competing factors combine to impose a particularly severe set of criteria is the filtration of oil well completion fluids. Flow rates and contaminant loadings of the oil well completion fluid are typically very high, yet effluent quality must be strictly controlled. In view of the sometimes remote locations involved, including on off-shore drilling platforms, equipment and operating costs can be very high, while space availability can be rather limited.

The principal object of the present invention is to provide a high capacity filter assembly in which the filter medium comprises multiple filter cartridges which can be quickly, conveniently and reliably replaced.

A related object of the present invention is to provide a high capacity filter assembly which, depiste large and heavy components, has a removable filter array which facilitates the rapid changeover of multiple filter cartridges by hand and at a comfortable level of exertion.

These and other objects and advantages of the invention will become apparent upon reading the following detailed description and upon reference to the drawings in which:

FIG. 2 is a top view, in partial section, of the filter assembly of FIG. 1;

FIG. 3 is a bottom view, in partial section, of the filter assembly of FIG. 1;

FIG. 6 is a partial sectional view taken along line 6—6 of FIG. 4 showing the removable filter array and, in phantom, the filter assembly components with which the removable filter array interacts;

FIG. 7 is a partial sectional view taken along line 7—7 of FIG. 4 showing the removable filter array in the condition it assumes when lifted out of its operative position within the filter assembly;

FIGS. 8a and 8b are enlarged partial sectional views of alternative embodiments for sealing filter cartridges to the filter array separation plate.

Figure 1:
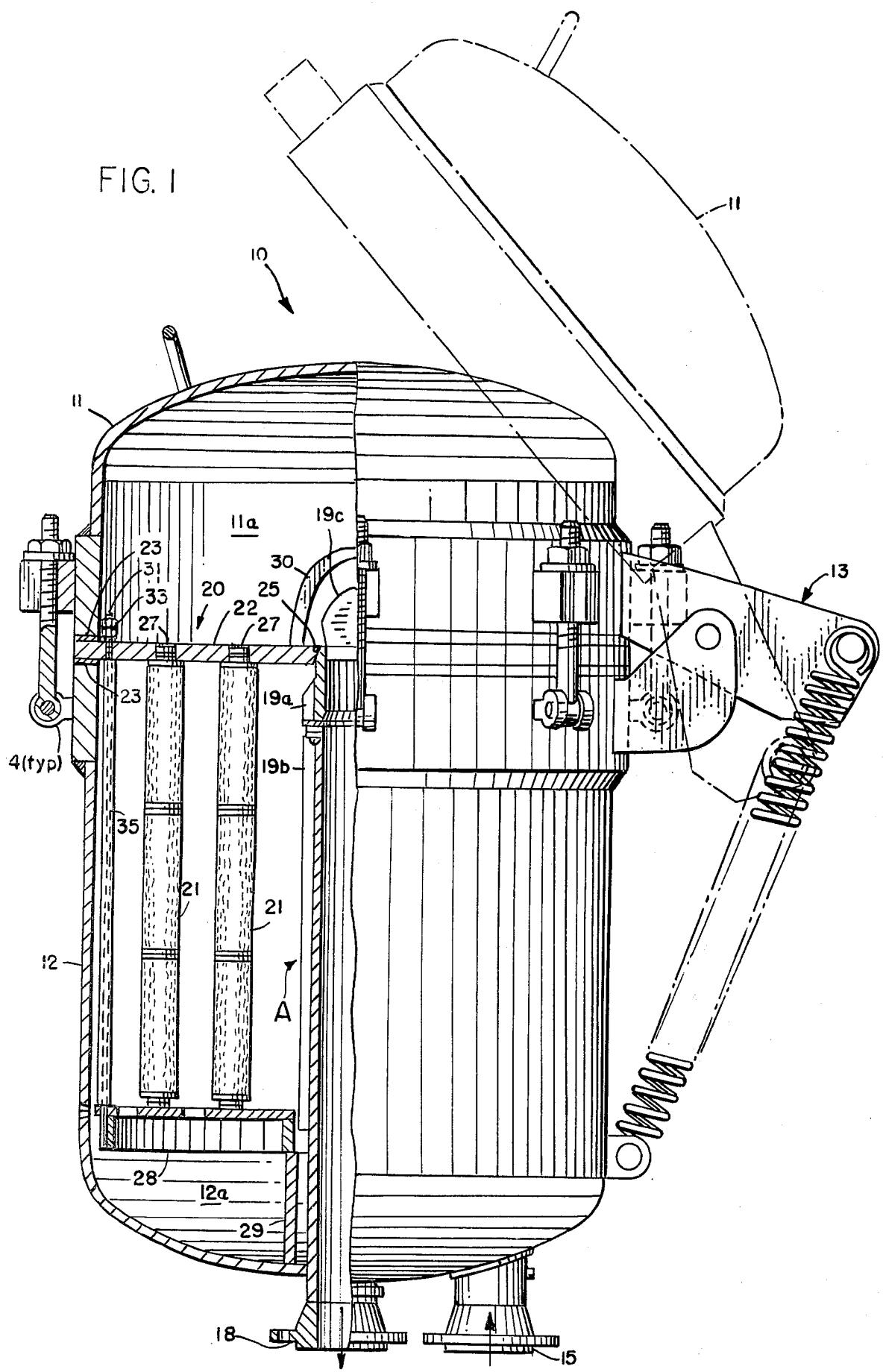
FIG. 1 is an elevation, in partial section, of a filter assembly according to the invention.

Referring first to FIG. 1, a filter assembly 10 according to the invention is shown. The housing of this filter assembly 10 comprises an upper housing portion 11 and a lower housing portion 12 shown hinged to one another via a spring-loaded hinge mechanism 13 and releasably held together in the operative condition shown with a series of latch bolt mechanisms 14. See also FIG. 2. The lower housing portion 12 in the embodiment shown is provided with a flanged inlet port 15 and a flanged drain port 16 (FIG. 3), both opening directly into a chamber 12a formed by the lower housing portion. The lower housing portion 12 is also shown provided with a centrally located flanged outlet port 18 in flow communication with a standpipe 19 located centrally within the chamber 12a and extending upwardly to substantially the horizontal plane of separation between the upper and lower housing portions. While this standpiple arrangement facilitates the hinged access to the interior of the housing through the avoidance of a fluid connection from the exterior directly in the chamber 11a formed by the upper housing portion 11, alternative arrangements may be employed without departing from the spirit of the present invention.

In keeping with an aspect of the invention which contemplates the rapid substitution of clean filter media for the spent filter media, the filter assembly 10 includes a removable filter array 20 which, in its working position as shown in FIG. 1, is positioned within the housing portions 11 and 12. With this arrangement an array 20 in which the filter cartridges 21 have served their useful lives can be quickly hoisted out of the housing as a unit thereby providing access to the spent cartridges to allow their removal and replacement with clean ones. Alternatively, to minimize downtime, an array 20 with spent cartridges 21 can be replaced in its entirety with a spare one having clean filter cartridges. The spent filter cartridges 21 of the removed array 20 can then be replaced with clean ones to ready the array for reinsertion into the filter assembly 10 at a subsequent changeout.

One element of the removable filter array 20 according to the invention is a separtion plate 22, sometimes referred to as a "tube sheet", which, in the working position as shown in FIG. 1, is held in the bite between the upper and lower housing portions 11 and 12, with gaskets 23 creating a fluidtight seal between the separation plate and the housing portions. As seen most clearly in FIG. 4, the separation plate 22 is shown with a relatively large central aperture 24 which, via gasket 25, sealingly engages the standpipe 19. It will be appreciated that, if, instead of a standpipe 19, a fluid outlet is provided in the wall of the upper housing portion 11 above the separation plate 22, the central aperture 24 can be eliminated.

Provision is made for one end of filter cartridges 21 to sealingly engage the separation plate 22. As will be appreciated from the discussion which follows, the invention is particularly suited for use with any of a variety of sealing arrangements in which the engagement and disengagement operations involve the generally axial movement of filter cartridge substantially normal to the separation plate. One such sealing arrangement is shown for illustrative purposes throughout FIGS. 1 to 7; two others are shown in FIGS. 8a and 8b. As best seen in the views of FIG. 5, the sealing arrangement shown in FIGS. 1 to 7 employs adapters in the form of male projections 21a at one end of the filter cartridges 21 which sealingly engage a corresponding number of substantially uniformly spaced mating adapters in the form of apertures 27 in the separation plate 22.

Figure 4:
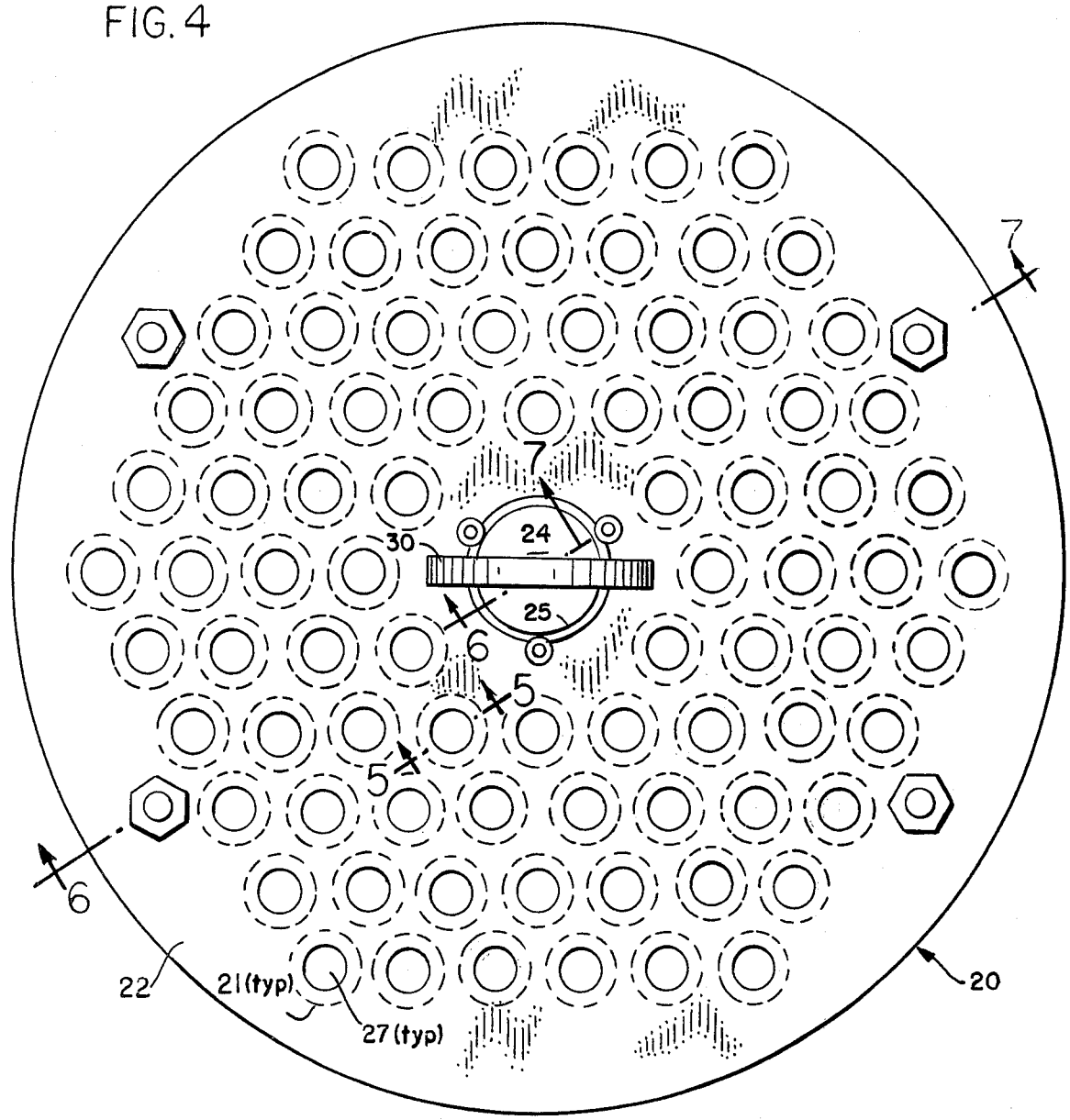
FIG. 4 is a top view of a removable filter array of the filter assembly of FIG. 1.

The specific number, type and configuration of the filter cartridges 21 may vary from application to application; FIG. 4 illustrates a typical arrangement. The present invention is particularly suited for use with a large number (84 in the embodiment shown) of elongated cylindrical cartridges such as may be fabricated either as a single continuous cartridge or by joining two or more unit lengths (typically about 10 inches long) end-to-end. The figures depict filter cartridges 21 each fabricated from three such unit lengths (for a total of 252 unit lengths), but it will be appreciated that other arrangements using fewer or more cartridges in shorter or taller stacks can be employed without in any way departing from the spirit of the present invention. By way of specific example, oil well completion filtration systems have been designed embodying the present invention which utilize as many as 300 10 inch unit cartridges arranged in 4-high stacks. As disclosed in co-pending U.S. application Ser. No. 305,070, filed Sept. 24, 1981, now abandoned, a specific type of unit filter successfully used in such systems is one marketed by Pall Corporation under the trade designation Epocel ®.

Figure 5A:
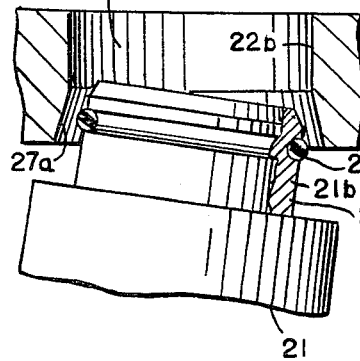
FIGS. 5a, 5b and 5c are enlarged partial sectional views taken along line 5—5 of FIG. 4 showing the top of a filter cartridge at different stages of engagement with an aperture the separation plate of the filter array.

The views of FIG. 5 illustrate the details of the arrangement shown in FIGS. 1 to 7 for sealing the projection 21a at the end of a filter cartridges 21 to an aperture 27 of the separation plate 22. The hollow cylindrical male projection 21a is somewhat smaller in outside diameter than the minimum inside diameter of the aperture 27. A groove 21b (See FIG. 5(a)) around the projection 21a near its end receives an O-ring 21c having an uncompressed outside diameter somewhat greater than the minimum inside diameter of the aperture 27. As shown in FIG. 5, the aperture 27 may be provided with an enlarged conical pilot portion 27a providing a transition to embodiment of the invention, as discussed below, the support platform 28 is arranged to serve the further function of preventing the complete disengagement of the filter cartridges during the manipulation of the removable filter array during an array replacement operation. Moreover, the support platform 28 of the preferred embodiment assists in the removal and insertion of filter catridges during a cartridge exchange operation.

Prior to discussing the details of the support platform 28 and its connection to the separation plate 22, however, it will be helpful to briefly summarize the overall flow arrangement of the filter assembly 10. Under normal operating conditions the drain port 16 is blocked, with the inlet 15 being connected to a pressurized source of fluid (not shown) to be filtered. The fluid entering under pressure through the port 15 rises within the chamber 12a through the perforated support platform 28 and is filtered by passing through the walls of filter cartridges 21 into the interiors thereof. The filtrate in the interiors of the filter cartridges 21 then passes upwardly through the apertures 27 in the separation plate 22, whereupon it enters the standpipe 19 through the aperture 24 in the separation plate. The filtrate exits the filter assembly through port 18.

Figure 5B:
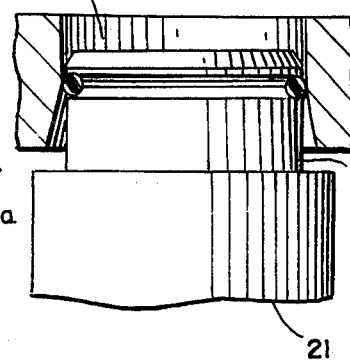
Figure 5C:
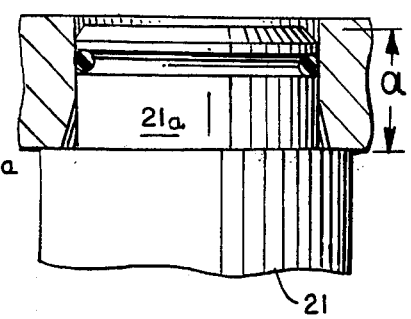

Turning again to a consideration of the details and operation of the removable filter array 20, the perforated support platform 28 is slightly smaller in diameter than the inside diameter of the chamber 12a. In the embodiment shown it has a central opening 28a which allows it to freely slip over the standpipe 19 as the removable filter array 20 is placed into and subsequently removed from the filter assembly 10. As a related point, in view of the removable nature of a smaller cylindrical bore 27b to allow the O-ring 21c to be progressively compressed without pinching as the male end 21a of the filter cartridge 21 is inserted into the aperture. FIGS. 5a, 5b and 5c show a typical insertion sequence. It will be appreciated that a filter cartridge may be removed by simply reversing the steps shown in FIG. 5.

Although the filter cartridge/separation plate sealing arrangement discussed above results in a degree of frictional resistance to the axial disengagement of the projection 21a from the aperture 27 arising from the radial compression of the O-ring 21c, under certain operating conditions the filter cartridge projections might partially or completely disengage from the apertures unless provision is made to prevent it. One such condition might be the unintentional reversing of the flow, or could occur through valve misoperation. While such disengagement during operation must clearly be avoided, ideally the method for preventing it should still facilitate the rapid replacement of spent filter cartridges 21. To this end, the removable filter array 20 according to the present invention is provided with a dual-position perforated support platform 28 connected to the separation plate 22 and located beneath the lower, blind ends 21d of the filter cartridges 21. This support platform 28 serves the function of preventing the disengagement of the filter cartridges during the operation of the filter assembly while accommodating the removal and insertion of filter cartridges during a cartridge exchange operation.

Complete or partial filter cartridge disengagement might also occur during the removal of a filter array 20. While even complete disengagement at that time would not affect performance, it could cause serious operator inconvenience and prolong the changeout period. Accordingly, in a preferred the filter array 20, the standpipe 19 may be made in two or more sections to facilitate repair and/or replacement of the upper end in the event the latter is damaged in the course of handling the removable filter array. Such a multi-piece construction is illustrated in FIG. 1, wherein an upper portion 19a of the standpipe is shown gasketed and bolted to a lower portion 19b. Attention is also drawn to a flat vertical guide plate 19c which extends diametrically across the upper end of the standpipe portion 19a to pilot first the support platform 28 and then the separation plate 22 onto the standpipe.

In the embodiment shown, the support platform 28 is constructed of relatively thin plate 28b reinforced by inner and outer rings 28c and 28d interconnected with circumferentially spaced, radially extending ribs 28e (see especially the sectional view in FIG. 3). The sheet 28b has a series of holes 28f therethrough to allow the free flow of fluid from one side of the support platform 28 to the other. While the number and location of the holes 28f is not critical to the operation of the invention as long as the fluid flow is not unduly restricted, it is considered generally desirable to avoid placement of the holes in direct vertical alignment with the apertures 27 in the separation plate 22.

With the removable filter array 20 in its operative position (as illustrated in FIG. 1), the support platform 28 rests upon a stop in the lower housing portion 12. In the embodiment shown the stop is in the form of a hollow cylindrical stool 29 coaxial with the standpipe 19. The stool 29 shown is sized such that it engages the inter ring 28c and/or the ribs 28e of the support platform 28. In keeping with the present invention, by maintaining a fairly close tolerance on the height of the stop, i.e., the stool 29 in the embodiment shown, relative to the upper rim of the lower housing portion 12, the blind ends 21d of the filter elements 21 are supported during operation to prevent the inadvertent disengagement of the ends 21a of the filter cartridges from the apertures 27. In order to accommodate the manufacturing tolerances of the various components, the height of the stop may be adjustable. Height adjustment of the stop arrangement shown in FIG. 1 may be facilitated by simply installing the stool 29 loose over the standpipe 19 in the lower housing portion 12 such that it may be readily removed for adjustment or replacement.

Considering further the range of stop height which is acceptable, it will be appreciated that too high a stop may hold the cartridges at too high a level and prevent the separation plate 22 from properly seating on the gasket 23. Too low a stop, on the other hand, may fail to guard against the inadvertent disengagement of the filter cartridge projections 21a from the apertures 27.

Accordingly, the stop height may be established such that the support platform 28 is held slightly below and out of contact with the blind ends 21d of the filter cartridges 21, but significantly less than the amount required for complete axial disengagement of the projections 21(a) from the apertures 27. With such an arrangement, any concern that the separation plate 22 might not seat properly on the gasket 23 because the blind ends 21d filter elements 21 have "bottomed-out" on the support platform 28 would be eliminated. On the other hand, such an arrangement would limit the amount of axial disengagement the filter cartridge ends 21a relative to the separation plate apertures 27, to positions intermediate those shown in FIG. 5b and 5c. Throughout that range of positions the O-ring 21c is fully compressed in the upper bore 27b of the aperture 27, assuring a fluid seal.

In FIG. 6 there is shown a partial elevational sectional view of the removable filter array 20 according to the invention in the condition it assumes when in place within the filter assembly 10. The upper rim of the lower housing portion 12, the standpipe 19 and the stool 29 are shown in phantom as points of reference.

In keeping with an important aspect of the present invention, the removable filter array 20 is constructed in such a manner that the spacing between the separation plate 22 and the support platform 28 automatically increases when the filter array is lifted from its operative position (as shown in FIGS. 1 and 6) to accommodate the removal of spent cartridges and insertion of new or cleaned cartridges. The manner in which this change in the spacing between the separation plate 22 and the support platform 28 is effected may be seen by comparing FIG. 6 to the similar partial elevational sectional view of FIG. 7, which illustrates the removable filter array 20 in the condition it assumes when withdrawn from the housing portions 11 and 12, as with an overhead crane and cable attached to a bail 30.

As may be seen in FIGS. 6 and 7, in the embodiment shown the perforated support platform 28 is connected to the separation plate 22 via four rods 31. With the particular arrangement shown, the lower ends of the rods 31 are fixed to the perforated support platform 28, as by welding. The upper ends of the rods 31 pass through apertures 32 in the separation plate 22 and are free to shift axially relative to it. As discussed in more detail below, double nuts 33 threaded onto the upper ends of each of the rods 31 limit the downward movement of the rods relative to the separate plate 22. O-rings 34 retained in grooves in the rods seal against the internal bore of the apertures 32 to prevent the bypass of unfiltered fluid directly through the clearance between rods 31 and the apertures 32 in the separation plate 22.

As depicted in FIG. 6, with the embodiment shown, once the removable filter array 20 is lifted so that the support platform 28 is no longer supported by the stool 29, the support platform will assume a lower position, relative to the separation plate 22, with the former hanging from the latter via the rods 31. It will be appreciated that the nuts 33 can be adjusted on the rods 31 to set the amount of relative travel between the support platform 28 and the separation plate 22.

In order to limit the unrestrained shifting of the rods 31 upward relative to the separation plate 22, (as might occur, for example, when the removable filter array 20 is set down after the filter cartridges 21 have been removed but not yet replaced) supports for the separation plate 22 may be provided. Such supports in the embodiment shown are in the form of sleeves 35 over the rods 31. By sizing the sleeves to prevent their upper ends from "bottoming out" against the lower surface of the separation plate 21 with the removable filter array 20 in the FIG. 6 condition, the sleeves can provide the desired support when required without interference with the function of the support platform 28 of maintaining the filter cartridges ends 21a engaged in the separation plate apertures 27. It will be appreciated that other types of supports, such as adjustable nuts or bosses welded to the rods, can be substituted.

While the rod arrangement shown in FIGS. 6 and 7 has been found to be highly satisfactory in apparatus designed for filtration of oil well completion fluid, the automatic dual position support platform of the present invention can be accomplished with other arrangements, some quite different in structure from that shown. An arrangement which might be suitable for some applications is one in which the rods similar to the rods 31 are fixed at their upper ends to the separation plate 22, with their lower end capable of supporting, but being shiftable relative to the support platform 28—essentially an "upside down" version of the embodiment shown. This alternative would offer the advantage of eliminating the need for a sliding seal at the rod/separation plate interface.

In another contemplated embodiment, three or more flexible chains or cables could be connected between the separation plate 22 and the support platform 28 at spaced locations around their peripheries. The lengths of the chains or cables could be adjusted to permit the desired spacing between the separation plate 22 and the support platform 28 when taut with the removable filter array in the equivalent of the FIG. 7 condition. The chains or cables would simply go slack with the removable filter array in the equivalent of FIG. 6 condition, with the support platform 28 supported by a stop such as the stool 29. Adjustability for each chain or cable could be provided through an eyebolt with a double-threaded nut arrangement similar to that shown in FIG. 6. It will be appreciated that an embodiment with a flexible interconnection between the separation plate 22 and the support platform 28 might not be as readily fitted with supports for the separation plate as is the FIG. 6 embodiment with the sleeves 35. Also, the flexible connection would permit a degree of free swinging lateral movement of the support platform 28 relative to the separation plate 22, as during handling. Nevertheless, the embodiment might be advantageous for economical or other reasons in certain applications.

Referring again to the embodiment shown in FIGS. 1-7, in keeping with an aspect of the invention, the amount of relative movement between the support plate 22 and the separation platform 28 can vary from application to application depending upon the clearance required beneath the blind ends 21d of the filter cartridges 21 for removal (or insertion) of the cartridges. In the preferred practice of the invention, the relative movement is restricted to that which permits removal and insertion of the filter cartridge at an angle but which prevents vertical disengagement. Referring to FIG. 5c, the distance A represents the penetration of the filter cartridge end 21a into an aperture 27 in the separation plate 22. To withdraw the filter cartridge 21 axially from the aperture, with the lower blind end 21d of the cartridge 21 in substantial vertical alignment with the projection 21a, a clearance B beneath the cartridges equal to or slightly greater than the distance A would be required. As depicted by the phantom lines for the right filter cartridge 21 in FIG. 7, however, if the cartridge is removed (or inserted) at an angle, a somewhat lesser clearance B beneath the cartridges would be adequate.

Geometrically, for a filter cartridge having a fairly high length to diameter ratio the amount by which the clearance can be reduced from the distance A is approximated by the product of the cartridge length times the factor (1-cos α) where α is the angle of vertical misalignment. For the purpose of illustration, assume a slender filter cartridge having a total length of 30.7 inches which, in the fully seated (FIG. 5c) condition, requires a distance C in FIG. 6 between the separation plate 22 and the support platform 28 of 30 inches with a 0.7 inch penetration (distance A) of the projection 21a into the aperture 27. With such a filter a 10°-off-vertical insertion angle would permit a clearance B of only about 0.3 inches such that the FIG. 7 distance D between the separation plate 22 and the support platform 28 would need be only about 30.3 inches. Accordingly, for the example given, by adjusting the nuts 33 to provide a clearance of at least about 0.3 inches but less than 0.7 inches will assure that the filter cartridges 21 can be removed and inserted, yet the support platform 28 will still be in a position to prevent the inconvenient, inadvertent complete dislodgement of filter cartridges as the removable filter array 20 is transported back and forth between the filter assembly 10 and the station (not shown) for replacing the cartridges. Specifically, with the example given, even if a filter cartridge 21 would disengage to the extent that the blind end 21d would rest on the support platform 28, the projection 21a would still penetrate about 0.4 inches (0.7 minus 0.3) into the aperture. This penetration would approximate that shown in FIG. 5b.

From the discussion in the previous paragraph it will be appreciated that it is preferable to employ a filter cartridge/separation plate engagement system which accommodates at least a moderate degree of angular deflection of the cartridge from the vertical. Referring again to FIG. 5, the conical pilot bore 27a facilitates such angular deflection.

The presence of the support platform 28 generally assists in the insertion of the filter cartridge ends 21a into the apertures 27 by providing support and facilitating positioning. It also serves a more subtle function. As a result of the minimal clearance B discussed above, even with the blind end 21d of the filter cartridge 21 in contact with the support platform 28, the filter cartridges must be inserted (and removed) with the lower, blind end 21d of the filter cartridge out of vertical alignment with the upper end 21a, at least until partial engagement of the upper end 21a in the aperture 27 is achieved (e.g., FIG. 5b). This arrangement is advantageous in that it permits the operator to slide the blind end 21d of the filter cartridge 21 along the support plate to obtain support and to effect a mechanical advantage in achieving the FIG. 5b condition. In fact, according to fundamental geometric and engineering principles, the mechanical advantage which the operator realizes increases continually as the filter cartridge 21 approaches verticality.

Once the filter cartridge 21 is vertical, with the projection 21a in the FIG. 5b condition (See also the right filter cartridge in FIG. 7), the operator need only overcome the frictional resistance of the compressed O-ring 21c against the bore 27b to effect the final seating into the FIG. 5c condition. In some instances some or all of the final seating can be left until the removable filter array 20 is inserted into the filter assembly 10. At that time the heavy separation plate 22 might effect the final seating under the influence of gravity. Alternatively, some of the seating can be effected by the closing of the upper housing portion 11 and the tightening down of the latch bolts 14.

Yet another option which the operator has in inserting and seating the filter cartridges 21 with the arrangement of the present invention is to temporarily interpose a spacer between the blind end of the filter cartridge and the support platform 28 as the filter cartridge is being inserted. If the thickness of the spacer is chosen to substantially equal the clearance B between blind ends 21d of the filter cartridges 21 and the support platform 28 with the removable filter array 20 in the condition shown in FIG. 7 (i.e., approximately 0.3 inches for the example given), it will be appreciated that the filter cartridge will be substantially fully seated in the FIG. 5c condition when the operator slides the filter cartridge into verticality. Experience has shown that the tip of one or more fingers under the blind end 21d serves admirably as a shim, a factor which adds further to the overall simplicity with which filter cartridge changeover can be effected with the present invention.

Two alternative embodiments of adapters for the ends of the filter cartridges which mate with the separation plate adapters are shown in FIGS. 8a and 8b. In both of these embodiments the filter cartridge adapter can be a single element integral with the end cap of the cartridge, thereby providing an economical alternative to the embodiment described above which requires a separate O-ring. In the FIG. 8a embodiment the projection 121a includes an external annular bulbous portion 121b and may be formed of any suitable material which ensures a leak-tight seal with the wall of the aperture 127 in the separation plate 122. Examples of such materials are thermoplastics such as polypropylene and polyester, which offer the advantages of being readily attached directly to the filter element. Elastomers, e.g., urethanes, might also be employed. As with the embodiment shown in detail in the views of FIG. 5, the FIG. 8a embodiment provides for the axial penetration of the projection 121a into the aperture 127 and, in view of its resiliency, accommodates angled insertion and removal.

Turning to the FIG. 8b embodiment, the projection 221a is similar to that of FIG. 8a except the annular bulbous portion 221b is internal rather than external. The separation plate 222 is provided with a tubular insert 227a against which the bulbous portion 221b seats. A counterbore 227b accommodates the axial penetration of the projection 221a beyond the lower surface of the separation plate 222. This embodiment also permits angular insertion and removal of the filter cartridge and, hence, may be used in connection with a removable filter array according to the present invention having a dual position support platform.

We claim:

1. A multiple cartridge filter assembly comprising:
   (a) a housing having upper and lower portions securable face-to-face to form an enclosed sealed spaced having an inlet for pre-filtered fluid and an outlet for filtrate;
   (b) a removable filter array comprising:
      (1) a plurality of elongated filter cartridges each having a blind end and an adapter at the other end for axial engagement with a mating adapter;
      (2) a separation plate securable substantially horizontally within the housing in a working condition in which the separation plate defines upper and lower filter chambers, one chamber being for prefiltered fluid, the other chamber being for filtrate, the separation plate having a plurality of adapters to mate form below with the adapters of filter cartridges, the filter cartridge adapter creating a fluidtight seal with the separation plate adapter with the former axially engaged with the latter;
      (3) a filter cartridge support platform; and
      (4) means connecting the support platform to the separation plate in a substantially horizontal position beneath the blind ends of the filter cartridges, the connection between the separation plate and the support platform permitting the support platform to shift between a first position in which it retains the filter cartridge adapters axially engaged with the separation plate adapters and a second position wherein the support platform is spaced from the separation plate by a greater distance than in the first position, the spacing between the separation plate and the support platform with the latter in the second position being sufficient to permit the insertion and removal of the filter cartridges, the support plate automatically assuming the second position unless restrained from beneath, and
   (c) stop means within the housing for holding the support platform in substantially the first position when the removable filter array is within the housing with the separation plate in its working condition.

2. The multiple cartridge filter assembly of claim 1 wherein the spacing between the separation plate and the support platform with the latter in the second position is sufficient to permit the insertion and removal of the filter cartridges at an oblique angle relative to the separation plate but insufficient to permit the vertical insertion and removal of the filter cartridges.

3. The multiple cartridge filter assembly of claim 1 or 2 wherein the connection between the separation plate and the support platform permits the support platform to shift under the influence of gravity.

4. The multiple cartridge filter assembly of claim 3 wherein the means connecting support platform to the separation plate comprises at least three circumferentially-spaced tension members extending generally vertically between the separation plate and the support platform, the opposite ends of the tension members being connected to the respective removable filter array components.

5. The multiple cartridge filter assembly of claim 4 wherein the tension members are rods, each of the rods being fixed at one end to its respective removable filter array component, the other end of each rod being free to shift vertically relative to its respective filter array component whereby the support platform may shift between its first and second positions relative to the separation plate.

6. The multiple cartridge filter assembly of claim 5, the upper ends of the rods being free to shift relative to the separation plate, the rods extending through apertures in the separation plate, the removable filter array further comprising means to seal between the rods and the apertures to prevent the bypass of fluid.

7. The multiple cartridge filter assembly of claim 5, the ends of the rods which are free to shift relative to its respective removable filter array component being threaded, the removable filter array further comprising at least one nut associated with each threaded rod end to provide an adjustable limit for the shifting of the rod relative to its respective component.

8. The multiple cartridge filter assembly of claim 1 or 2, the filter cartridge adapter comprising a male projection and an annular sealing means, the separation plate adapter comprising an aperture in the separation plate into which the male projection plugs for sealing engagement therewith.

9. The multiple cartridge filter assembly of claim 8 wherein the sealing means is an O-ring retained in an external groove in the male projection.

10. The multiple cartridge filter assembly of claim 1 or 2 wherein the lower chamber is for prefiltered fluid and the upper chamber is for filtrate.

* * * * *

UNITED STATES PATENT AND TRADEMARK OFFICE
CERTIFICATE OF CORRECTION

PATENT NO. : 4,419,234

DATED : December 6, 1983

INVENTOR(S) : John D. Miller and Clayton L. Reed

It is certified that error appears in the above-identified patent and that said Letters Patent is hereby corrected as shown below:

Columns 3 and 4 should be deleted and the attached page consisting of columns 3 and 4 substituted therefor.

Signed and Sealed this

Third Day of April 1984

[SEAL]

Attest:

Attesting Officer

GERALD J. MOSSINGHOFF

Commissioner of Patents and Trademarks placed with clean ones to ready the array for reinsertion into the filter assembly 10 at a subsequent changeout.

One element of the removable filter array 20 according to the invention is a separtion plate 22, sometimes referred to as a "tube sheet", which, in the working position as shown in FIG. 1, is held in the bite between the upper and lower housing portions 11 and 12, with gaskets 23 creating a fluidtight seal between the separation plate and the housing portions. As seen most clearly in FIG. 4, the separation plate 22 is shown with a relatively large central aperture 24 which, via gasket 25, sealingly engages the standpipe 19. It will be appreciated that, if, instead of a standpipe 19, a fluid outlet is provided in the wall of the upper housing portion 11 above the separation plate 22, the central aperture 24 can be eliminated.

Provision is made for one end of filter cartridges 21 to sealingly engage the separation plate 22. As will be appreciated from the discussion which follows, the invention is particularly suited for use with any of a variety of sealing arrangements in which the engagement and disengagement operations involve the generally axial movement of filter cartridge substantially normal to the separation plate. One such sealing arrangement is shown for illustrative purposes throughout FIGS. 1 to 7; two others are shown in FIGS. 8a and 8b. As best seen in the views of FIG. 5, the sealing arrangement shown in FIGS. 1 to 7 employs adapters in the form of male projections 21a at one end of the filter cartridges 21 which sealingly engage a corresponding number of substantially uniformly spaced mating adapters in the form of apertures 27 in the separation plate 22.

The specific number, type and configuration of the filter cartridges 21 may vary from application to application; FIG. 4 illustrates a typical arrangement. The present invention is particularly suited for use with a large number (84 in the embodiment shown) of elongated cylindrical cartridges such as may be fabricated either as a single continuous cartridge or by joining two or more unit lengths (typically about 10 inches long) end-to-end. The figures depict filter cartridges 21 each fabricated from three such unit lengths (for a total of 252 unit lengths), but it will be appreciated that other arrangements using fewer or more cartridges in shorter or taller stacks can be employed without in any way departing from the spirit of the present invention. By way of specific example, oil well completion filtration systems have been designed embodying the present invention which utilize as many as 300 10 inch unit cartridges arranged in 4-high stacks. As disclosed in co-pending U.S. application Ser. No. 305,070, filed Sept. 24, 1981, now abandoned, a specific type of unit filter successfully used in such systems is one marketed by Pall Corporation under the trade designation Epocel ®.

The views of FIG. 5 illustrate the details of the arrangement shown in FIGS. 1 to 7 for sealing the projection 21a at the end of a filter cartridges 21 to an aperture 27 of the separation plate 22. The hollow cylindrical male projection 21a is somewhat smaller in outside diameter than the minimum inside diameter of the aperture 27. A groove 21b (See FIG. 5(a)) around the projection 21a near its end receives an O-ring 21c having an uncompressed outside diameter somewhat greater than the minimum inside diameter of the aperture 27. As shown in FIG. 5, the aperture 27 may be provided with an enlarged conical pilot portion 27a providing a transition to a smaller cylindrical bore 27b to allow the O-ring 21c to be progressively compressed without pinching as the male end 21a of the filter cartridge 21 is inserted into the aperture. FIGS. 5a, 5b and 5c show a typical insertion sequence. It will be appreciated that a filter cartridge may be removed by simply reversing the steps shown in FIG. 5.

Although the filter cartridge/separation plate sealing arrangement discussed above results in a degree of frictional resistance to the axial disengagement of the projection 21a from the aperture 27 arising from the radial compression of the O-ring 21c, under certain operating conditions the filter cartridge projections might partially or completely disengage from the apertures unless provision is made to prevent it. One such condition might be the unintentional reversing of the flow, or could occur through valve misoperation. While such disengagement during operation must clearly be avoided, ideally the method for preventing it should still facilitate the rapid replacement of spent filter cartridges 21. To this end, the removable filter array 20 according to the present invention is provided with a dual-position perforated support platform 28 connected to the separation plate 22 and located beneath the lower, blind ends 21d of the filter cartridges 21. This support platform 28 serves the function of preventing the disengagement of the filter cartridges during the operation of the filter assembly while accommodating the removal and insertion of filter cartridges during a cartridge exchange operation.

Complete or partial filter cartridge disengagement might also occur during the removal of a filter array 20. While even complete disengagement at that time would not affect performance, it could cause serious operator inconvenience and prolong the changeout period. Accordingly, in a preferred embodiment of the invention, as discussed below, the support platform 28 is arranged to serve the further function of preventing the complete disengagement of the filter cartridges during the manipulation of the removable filter array during an array replacement operation. Moreover, the support platform 28 of the preferred embodiment assists in the removal and insertion of filter cartridges during a cartridge exchange operation.

Prior to discussing the details of the support platform 28 and its connection to the separation plate 22, however, it will be helpful to briefly summarize the overall flow arrangement of the filter assembly 10. Under normal operating conditions the drain port 16 is blocked, with the inlet 15 being connected to a pressurized source of fluid (not shown) to be filtered. The fluid entering under pressure through the port 15 rises within the chamber 12a through the perforated support platform 28 and is filtered by passing through the walls of filter cartridges 21 into the interiors thereof. The filtrate in the interiors of the filter cartridges 21 then passes upwardly through the apertures 27 in the separation plate 22, whereupon it enters the standpipe 19 through the aperture 24 in the separation plate. The filtrate exits the filter assembly through port 18.

Turning again to a consideration of the details and operation of the removable filter array 20, the perforated support platform 28 is slightly smaller in diameter than the inside diameter of the chamber 12a. In the embodiment shown it has a central opening 28a which allows it to freely slip over the standpipe 19 as the removable filter array 20 is placed into and subsequently removed from the filter assembly 10. As a related point, in view of the removable nature of the filter array 20, the stand-